United States Patent [19]

Minami

[11] Patent Number: 5,424,828

[45] Date of Patent: Jun. 13, 1995

[54] METHOD FOR MEASURING AND ANALYZING INTERFERENCE FRINGES USING A HALOGRAPHIC OPTICAL ELEMENT HAVING TWO PATTERNS FOR DIFFRACTING A LASER BEAM

[75] Inventor: Yoshitaka Minami, Ohmiya, Japan

[73] Assignee: Fuji Photo Optical Co., Ltd., Saitama, Japan

[21] Appl. No.: 94,480

[22] Filed: Jul. 19, 1993

[30] Foreign Application Priority Data

Oct. 8, 1992 [JP] Japan .................................. 4-270090

[51] Int. Cl.⁶ .............................................. G01B 9/021
[52] U.S. Cl. .................................... 356/348; 356/359; 359/15
[58] Field of Search ............... 356/348, 347, 354, 359, 356/360; 359/15, 17

[56] References Cited

U.S. PATENT DOCUMENTS 5,039,223  8/1991  Gemma et al. ..................... 356/348

Primary Examiner—Samuel A. Turner
Attorney, Agent, or Firm—Brumbaugh, Graves, Donohue & Raymond

[57] ABSTRACT

A method for measuring and analyzing interference fringes using a hologram interferometer. The hologram interferometer is provided with a holographic optical element which includes a first pattern for diffracting a laser beam as a reference beam in a direction which is different from the surface of an object to be measured and a second pattern for diffracting a laser beam as a measuring beam which is to be radiated onto the surface to be measured, and measures interference fringes resulting from interference between the reference beam and the beam reflected from the measured surface of the object. Interference fringes are measured while the phase of the interference fringes is successively changed by moving the holographic optical element parallel to a surface thereof by given amounts in a direction normal to the gratings of the first pattern, and the configuration of the measured surface is obtained by analyzing the fringes.

2 Claims, 2 Drawing Sheets

METHOD FOR MEASURING AND ANALYZING INTERFERENCE FRINGES USING A HALOGRAPHIC OPTICAL ELEMENT HAVING TWO PATTERNS FOR DIFFRACTING A LASER BEAM

BACKGROUND OF THE INVENTION

1. Field of the Invention

This invention relates to a method for measuring and analyzing interference fringes using a hologram interferometer, which employs a holographic optical element, for obtaining the configuration of a surface of an object to be measured.

2. Description of the Prior Art

The interference method is a widely known technique for accurately measuring the configuration of a spherical or aspherical surface. The measurement of configuration by the interference method is directed to obtain the degree of displacement of the surface to be measured relative to the high precision flat reference surface (the interference standard) from interference fringes which occurred as a result of interference of beams reflected from each surface.

The foregoing interference method is advantageous in that the accuracy of configuration of all surfaces can be verified instantaneously without making contact with the surface. Among others, an interference method using a computer generated hologram is now attracting attention, because it allows special configurations, other than those for flat surfaces or aspherical surfaces, to be measured. This computer generated hologram is produced by the steps of exposing a glass substrate covered with a photoresist to light by scanning electron beams across the substrate, and developing this pattern, so that the pattern becomes visible.

As one example of such hologram interferometers using the forgoing holographic optical element, there is put forward a holographic optical element provided with a first pattern for diffracting a laser beam as a reference beam in a direction which is different from that of a surface to be measured and a second pattern for diffracting a laser beam as a measuring beam which is to be radiated to that surface, and this holographic optical element measures interference fringes occurring as a result of interference between the reference beam and a beam reflected from the surface to be measured via the holographic optical element having the foregoing two types of patterns. The use of this type of hologram interferometer renders the flat reference surface unnecessary.

As another type of interferometer, the Fizeau interferometer is also widely accepted wherein interference fringes resulting from optical interference which occurs in response to a distance between the flat reference surface and the object are measured. As a measuring technique which employs this Fizeau interferometer, a fringe scanning technique is commonly known, wherein interference fringes are analyzed on the basis of variations in brightness at a certain location in accordance with changes of a relative distance between the object and the flat reference surface. The wide use of this technique owes to the fact that very accurate results about the configuration of the surface can be obtained.

Thus, since the hologram interferometer equipped with the holographic optical element having the foregoing two patterns does not have a flat reference surface, it is difficult to apply the fringe scanning technique, which successively measures interference fringes by moving the flat reference surface so that the distance between the flat reference surface and the object can be changed, to the measurement using the hologram interferometer.

In other words, according to the fringe scanning technique adopted in general Fizeau interferometers, the phase of interference fringes is changed by nominally displacing the position of the flat reference surface toward the optic axis in such a manner that a difference in an optical path length, between the reference beam reflected from a reference plane of the flat reference surface and an object beam reflected from a surface to be measured after having passed through the flat reference surface, is successively changed.

If the holographic optical element is moved along the optic axis by applying such a fringe scanning technique to the hologram interferometer, it is impossible to change the phase of interference fringes, and hence it is impossible to measure and analyze interference fringes by means of the fringe scanning technique.

SUMMARY OF THE INVENTION

In view of the foregoing observations and descriptions, the object of the present invention is to provide a measuring and analysis method for interference fringes using a hologram interferometer which allows a fringe scanning technique to be employed, wherein interference fringes which are different from each other in phase can be successively measured using a hologram interferometer which comprises a holographic optical element having a first pattern for diffracting a laser beam as a reference beam to the direction which is different from that of a surface to be measured and a second pattern for diffracting a laser beam as a measuring beam which is to be radiated onto the surface.

To this end, according to one aspect of this invention, there is provided a measuring and analysis method for interference fringes using a hologram interferometer, characterized in that the interferometer includes a holographic optical element which is composed of:

a first pattern for diffracting a laser beam as a reference beam in a direction which is different from that of a surface to be measured; and a second pattern for diffracting a laser beam as a measuring beam to be radiated onto the measured surface, and the measuring and analysis method comprises the steps of:

radiating a laser beam emanated from a laser light source through optical systems to an object via the holographic optical element; and measuring and analyzing interference fringes by moving the holographic optical element parallel to a surface thereof by given amounts in a direction which is orthogonal to gratings of the first pattern using the hologram interferometer which measures interference fringes occurring as a result of interference between the reference beam and a beam reflected from the surface of an object so that the interference fringes can be measured while the phase of the interference fringes is successively changed, and the fringes can be analyzed.

If the degree of phase displacement of the interference fringes differs at each coordinate when the second pattern of the holographic optical element is moved parallel to a surface thereof by given amounts in a direction which is orthogonal to the gratings of the first pattern, it is preferable to analyze interference fringes by putting data about the measured interference fringes at a predetermined coordinate into simultaneous equations.

With this arrangement, in the hologram interferometer, a laser beam emanated from a laser light source via optical systems is diffracted in two directions by means of the holographic optical element having two patterns. Namely, a beam diffracted by the first pattern becomes a reference beam having the same characteristics as those which a resultant beam again refracted by the second pattern will have when a surface of an object to be measured has an ideal configuration. And, a beam diffracted by the second pattern becomes a measuring beam which is to be radiated to the surface of the object. This measuring beam is reflected by the surface; returns along the optical path of incidence; and then enters the holographic optical element. The beam thus entered the optical element is again diffracted by the second pattern to the same direction as the reference beam; the reference beam and the measuring beam are superimposed one over the other; and these beams mutually interfere. Interference fringes corresponding to the configuration of the surface to be measured can be measured by causing this interference beam to converge and fall on a TV camera or a screen.

Following the measurement of interference fringes with the holographic optical element positioned at the reference location, the holographic optical element is moved parallel to a surface thereof by given amounts to a direction normal to the gratings of the first pattern, so that the phase of diffractions is changed, which in turn causes the phase of interference fringes to be successively varied. Data necessary for the fringe scanning technique are prepared by measuring these interference fringes which experienced phase variations, and the configuration of the surface is obtained by analyzing the fringe data.

DESCRIPTION OF THE PREFERRED EMBODIMENTS

Figure 1:
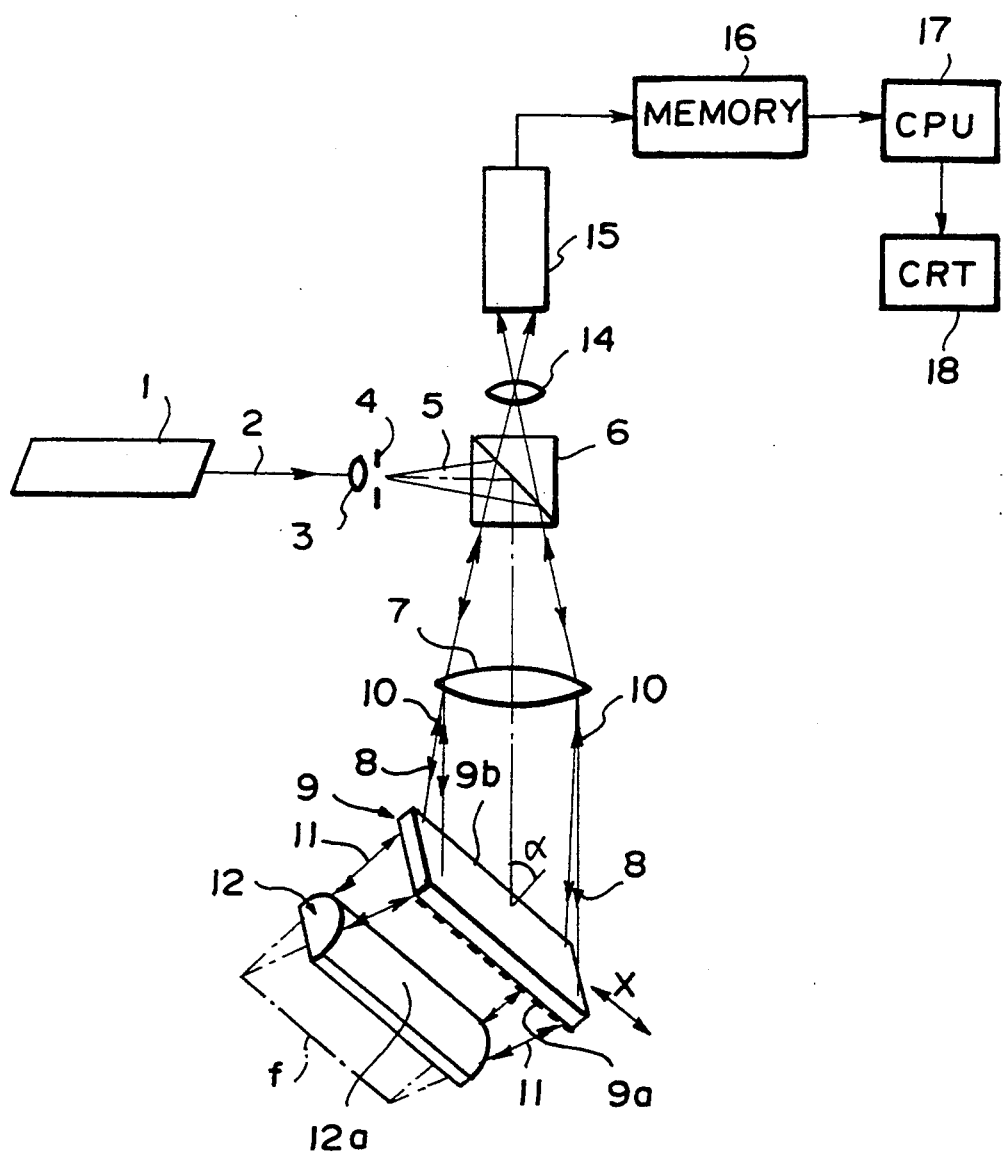
FIG. 1 is a schematic diagram showing the structure of a hologram interferometer, which is employed in the present invention, in accordance with one embodiment of the same.

Referring to the accompanying drawings, embodiments of the present invention will now be described in detail. FIG. 1 shows the arrangement of one example of a hologram interferometer used by the present invention.

This hologram interferometer comprises a laser light source 1, a condenser lens 3 for converging a laser beam 2 emanated from the light source 1, a pin hole 4 for converting the laser beam 2 into divergent rays 5 from which noise components of the laser beam 2 are removed, a beam splitter 6 for reflecting the divergent rays 5 in a direction which is changed by 90 degrees; a collimator lens 7 for converting the reflected diverging rays 5 into a parallel beam 8, and a holographic optical element 9 (HOE) having a pattern $9a$ for producing a reference beam 10 which is made of a parallel beam by the reflection and diffraction of the parallel beam 8 toward the direction of incidence and a measuring beam 11 which is a converged beam produced by the transmission and diffraction of the parallel beam 8. The measuring beam 11 is radiated onto a surface $12a$ to be measured of an object 12.

An object beam reflected from the surface $12a$ of the object 12 travels along the optical path of incidence in the reverse direction, and is converted into a parallel beam after it has passed through the holographic optical element 9. The parallel beam thus converted passes through the collimator lens 7 together with the reference beam, and reaches the beam splitter 6. Then, these beams are transmitted through this beam splitter 6.

An imaging lens 14, for producing images from both the reference beam and the object beam, and a TV camera 15, having a light receiving surface positioned on the focal plane of the imaging lens 14 for observing interference fringes produced by the reference beam and the object beam, are arranged on the outgoing side of the beam splitter 6.

Moreover, there are provided an image memory 16 for reading and storing images of the interference fringes acquired by the TV camera 15, a computing and processing means 17 (a computer) for analyzing the fringes on the basis of data about the interference fringes stored in the image memory 16, and a display means 18 such as CRTs for displaying results of the analysis.

The holographic optical element 9 is a planar optical element manufactured by the steps of: applying a photoresist over a glass substrate $9b$ covered with aluminum or chrome for reflection purposes; exposing the substrate to electron beams to produce two hologram patterns; developing the patterns; and subjecting the substrate to etching, so that a first pattern for producing a reference beam and a second pattern for producing a measuring beam are simultaneously formed on the substrate.

Figures 2A, 2B:
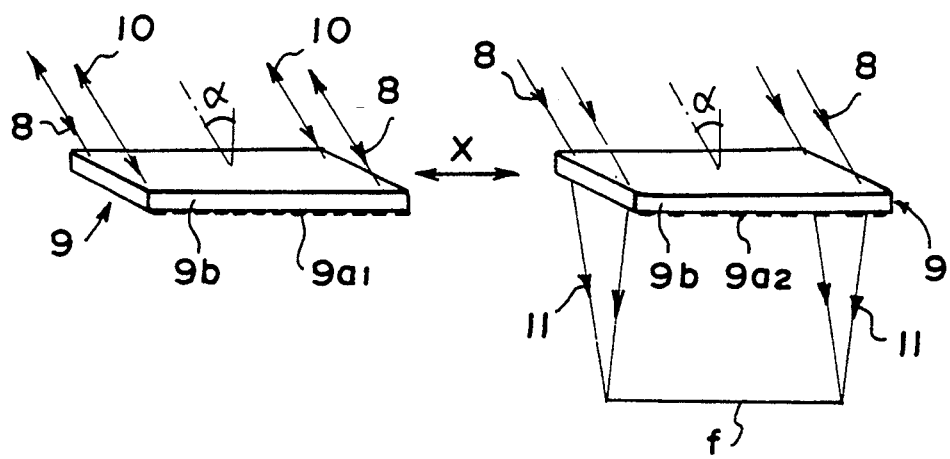
FIGS. 2A and 2B are explanatory views showing the diffracting state of a holographic optical element according to the example shown in FIG. 1.
Figures 3A, 3B:
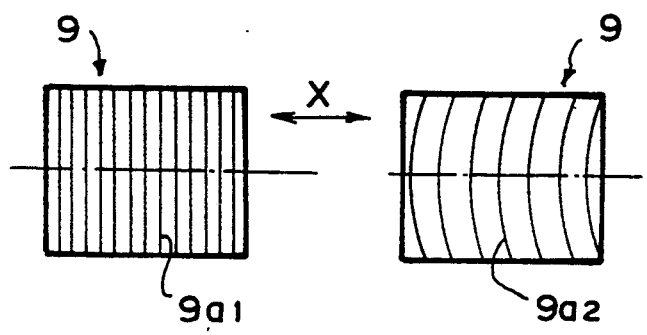
FIGS. 3A and 3B are explanatory views showing examples of hologram patterns according to the example shown in FIG. 1.

Namely, the first pattern $9a_1$ of the hologram pattern $9a$ is arranged in the shape of a grating pattern in order to diffract the reference beam 10 by reflecting the parallel beam 8, which is incident at an angle of $\alpha$, to the direction of incidence as it is as shown in FIG. 2A. In other words, as shown in FIG. 3A, this first pattern is a lattice pattern in which parallel linear lines are arranged at even intervals corresponding to the incident angle $\alpha$.

The second pattern $9a_2$ is in the form of a stripe pattern corresponding to the shape of the measured surface $12a$ of the object 12. For example, when the measured surface $12a$ of the object 12 is a cylindrical surface (a convex surface) having its axis normal to the grating pattern, in order to converge the parallel beam 8 which is incident at an angle of $\alpha$ as shown in FIG. 2B, the second pattern is a stripe pattern with pitches twice as large as those of the first pattern $9a_1$, wherein parallel curved lines corresponding to a focal distance f, that is, the angle of refraction, are arranged at even intervals in response to the foregoing incidence angle of $\alpha$ as shown in FIG. 3B.

The holographic optical element 9 is adjustably arranged so as to be movable parallel to a surface thereof in the direction x normal to the gratings of the first pattern $9a_1$. Any specific structure of this traveling mechanism is not illustrated, but this traveling mechanism is constituted, for example, so that a holder supporting the holographic optical element 9 can be disposed so as to be movable in the foregoing direction, and this holder can be moved by very small amounts by means of an actuator using a piezoelectric element.

The beam splitter 6 is an optical element for separating an incident beam into a transmitting beam and a reflecting beam, and functions to cause about one half of a diverging beam entering from the direction of the pin hole 4 to be reflected to the collimator lens 7, and cause about one half of a converged beam entering from the direction of the collimator lens 7 to transmit to the TV camera 15.

The measuring and analysis method for interference fringes using the foregoing hologram interferometer will be described. In the foregoing hologram interferometer, the laser beam 2 emanated from the light source 1 is converted into the parallel beam 8 through the optical systems from the condenser lens 3 to the collimator lens 7, and this parallel beam is incident on the holographic optical element 9. The incident beam is then diffracted, by means of the holographic optical element 9, into the reference beam 10 which is reflected to the direction of incidence and the measuring beam 11 which passes through the holographic optical element, and is diffracted.

As mentioned above, when the surface 12a of the object 12 to be measured is a reflecting mirror which constitutes a cylindrical surface, the second pattern $9a_2$ has a stripe pattern (see FIG. 3B) in which curved lines are arranged at even intervals along a direction normal to the center axis of the measured surface 12a. When a parallel beam 8 is radiated onto the hologram pattern $9a_2$ having such a stripe pattern of curved lines, the beam does not converge in the direction in which the curved lines are arranged, but the measuring beam 11 which converges to the direction to which the curved lines extend is emitted. In this instance, the measuring beam 11 is radiated onto the convex shaped measured surface 12a of the object 12 at right angles before it is linearly converged.

The object beam reflected from the measured surface 12a of the object 12 returns along the optical path of the measuring beam 11, and falls on the holographic optical element 9. The object beam is changed into a parallel beam by means of the second pattern $9a_2$ of the holographic optical element 9, and is superimposed on the reference beam 10 which is reflected in the form of a parallel beam, so that they interfere with each other. Resulting interference fringes are produced on the light receiving surface of the TV camera 15. Image data on the interference fringes of the measured surface 12a which are acquired by this TV camera 15 are input to the image memory 16.

Subsequently to the measurement of the interference fringes at the aforementioned reference position, the holographic optical element 9 is moved by given amounts in the direction X normal to the gratings of the first pattern $9a_1$, and resulting interference fringes are measured in the same manner as the previous interference fringes. The holographic optical element 9 is then moved by given amounts which are the same as the amount of the foregoing movement, and interference fringes are measured while the phase of the interference fringes is successively changed. Image data about the interference fringes are successively acquired by the TV camera 15, and are stored in the image memory 16.

On the basis of the image data about the interference fringes stored in the image memory 16, the interference fringes are analyzed by executing a predetermined computing processing by means of the computing processing means 17, so that the surface configuration of the measured surface 12a is obtained, and this result is then displayed on the display means 18.

The analysis of interference fringes is effected by moving the holographic optical element 9 parallel to a surface thereof to the direction x normal to the gratings of the first pattern $9a_1$ by given amounts, and by putting data about interference fringes at one predetermined coordinate among a plurality of image data successively measured into simultaneous equations.

That is, there is a relationship between a distance "d" between the flat reference surface and the measured surface 12a and the brightness I of interference fringes, and is expressed as $$I = I_0 \cos(2\pi d/\lambda + \Psi) + In$$

where $\lambda$ is a wavelength of beam, $\Psi$ is a phase, and "In" is a noise term.

As the holographic optical element 9 is moved by given amounts as mentioned above, the phase $\Psi$ is varied by predetermined values $\Delta\Psi$. When the brightness of the interference fringes is measured at positions which are successively varied, following simultaneous equations are obtained:

$$I_1 = I_0 \cos(2\pi d/\lambda + \Psi_0) + In$$

$$I_2 = I_0 \cos(2\pi d/\lambda + \Psi_0 + \Delta\Psi) + In$$

$$I_3 = I_0 \cos(2\pi d/\lambda + \Psi_0 + 2\Delta\Psi) + In$$

$$I_4 = I_0 \cos(2\pi d/\lambda + \Psi_0 + 3\Delta\Psi) + In.$$

The aforementioned distance "d" is obtained by the calculation of these equations. The "d" at each point is obtained by executing the above processing for each point of the measured surface 12a, and hence successive shape data about the entire measured surface 12a are obtained. The configuration of the measured surface 12a obtained by the analysis of the interference fringes is visually displayed on the display means 18 such as a CRT or an X-Y plotter.

It is possible to previously calculate the amount $\Delta\Psi$ of displacements, arising from the movement of the holographic optical element 9, from the amount of movement of the holographic optical element 9, and resulting interference fringes may be analyzed by using the amount of phase displacements.

In the foregoing embodiment, the measuring beam 11 has a particular effect on the convex surface in that the measuring beam is produced by passing the beam through the holographic optical element 9, and the optical path is assured even when the measured surface 12a is a convex surface. However, when the surface of the object to be measured is a concave surface, the reflected object beam returns along the incident optical path, and interference fringes can be measured in the same manner as the case of the convex surface by setting so that the measuring beam 11 once converged can diverge along the center axis of the cylindrical surface, and can be radiated onto a concave surface of the object to be measured.

Further, since interference fringes can be efficiently obtained when the amount of the reference beam is almost the same as that of the object beam, it is desirable to form a hologram pattern having a diffraction index corresponding to the reflective index of the object 12.

The pattern of the holographic optical element is to be changed when the shape and orientation of the measured surface of the object are changed. For instance, even when the measured surface of the object is a spherical or another aspherical reflecting plate, the configuration of the surface can be measured and analyzed by means of the hologram interferometer as set forth above by arranging the second pattern of the holographic optical element in a stripe pattern with predetermined curved lines. At this time, the analysis of interference fringes as mentioned above can be applied to the case where pitches of fringes of the second pattern of the holographic optical element are uneven, and hence the amount of variations of the interference fringes are different at each coordinate when the holographic optical element is moved by given amounts.

Here, the second pattern $9a_2$ of the holographic optical element is formed at even pitches, and the amount of displacements of the phase in response to the movement of the holographic optical element is rendered constant irrespective of coordinates of the image data, whereby it is possible to simplify the computing processing of the fringe analysis.

Also, the hologram interferometer may be replaced with a reflecting type interferometer. In the case of a reflecting type interferometer, a first pattern of the hologram pattern of the holographic optical element produces a reference beam in the form of a parallel beam by reflecting and diffracting a parallel beam to the direction of incidence, and a second pattern made of a reflecting coating produces a measuring beam in the form of a converged beam by reflecting and diffracting a parallel beam, whereby a reflected measuring beam is radiated onto the measured surface of the object.

According to the measuring and analysis method for interference fringes, wherein the interference fringes are measured while the phase of interference fringes is successively changed by moving the holographic optical element parallel to the surface thereof to a direction normal to the gratings of the first pattern using the hologram interferometer which comprises the holographic optical element having two hologram patterns, it is possible to measure interference fringes the phase of which is successively changed. The analysis of the fringes on the basis of the data about the interference fringes allows the configuration of the measured surface to be obtained with a high accuracy using a hologram interferometer which can be simplified in structure.

It will be understood that the above description of the present invention is susceptible to various modifications, changes and adaptations and the same are intended to be comprehended within the meaning and range of equivalents of the appended claims.

What is claimed is:

1. A measuring and analysis method for interference fringes using a hologram interferometer wherein the interferometer includes a holographic optical element which is composed of:

a first pattern for diffracting a laser beam as a reference beam in a direction which is different from that of a surface to be measured; and a second pattern for diffracting a laser beam as a measuring beam to be radiated onto the surface of an object to be measured, and the measuring and analysis method comprises the steps of:

radiating a laser beam emanated from a laser light source through optical systems onto the surface of an object via the holographic optical element; and measuring and analyzing interference fringes by moving the holographic optical element parallel to a surface of the holographic optical element by given amounts in a direction normal to gratings of the first pattern using the hologram interferometer, which measures interference fringes produced as a result of interference between the reference beam and a beam reflected from the measured surface of an object, so that the interference fringes can be measured while the phase of the interference fringes is successively changed.

2. A measuring and analysis method for interference fringes using a hologram interferometer as defined in claim 1, wherein if the degree of phase displacements of the interference fringes produced by the second pattern differs at each coordinate when the holographic optical element is moved parallel to a surface of the holographic optical element by given amounts in a direction normal to the gratings of the first pattern, the interference fringes are analyzed by putting data about the measured interference fringes at a given coordinate into simultaneous equations.

* * * * *